Nov. 6, 1951     A. N. GRAY     2,573,707
METHODS OF PROCESSING SULFUR-VULCANIZABLE ELASTOMER COMPOUNDS
Filed May 13, 1949
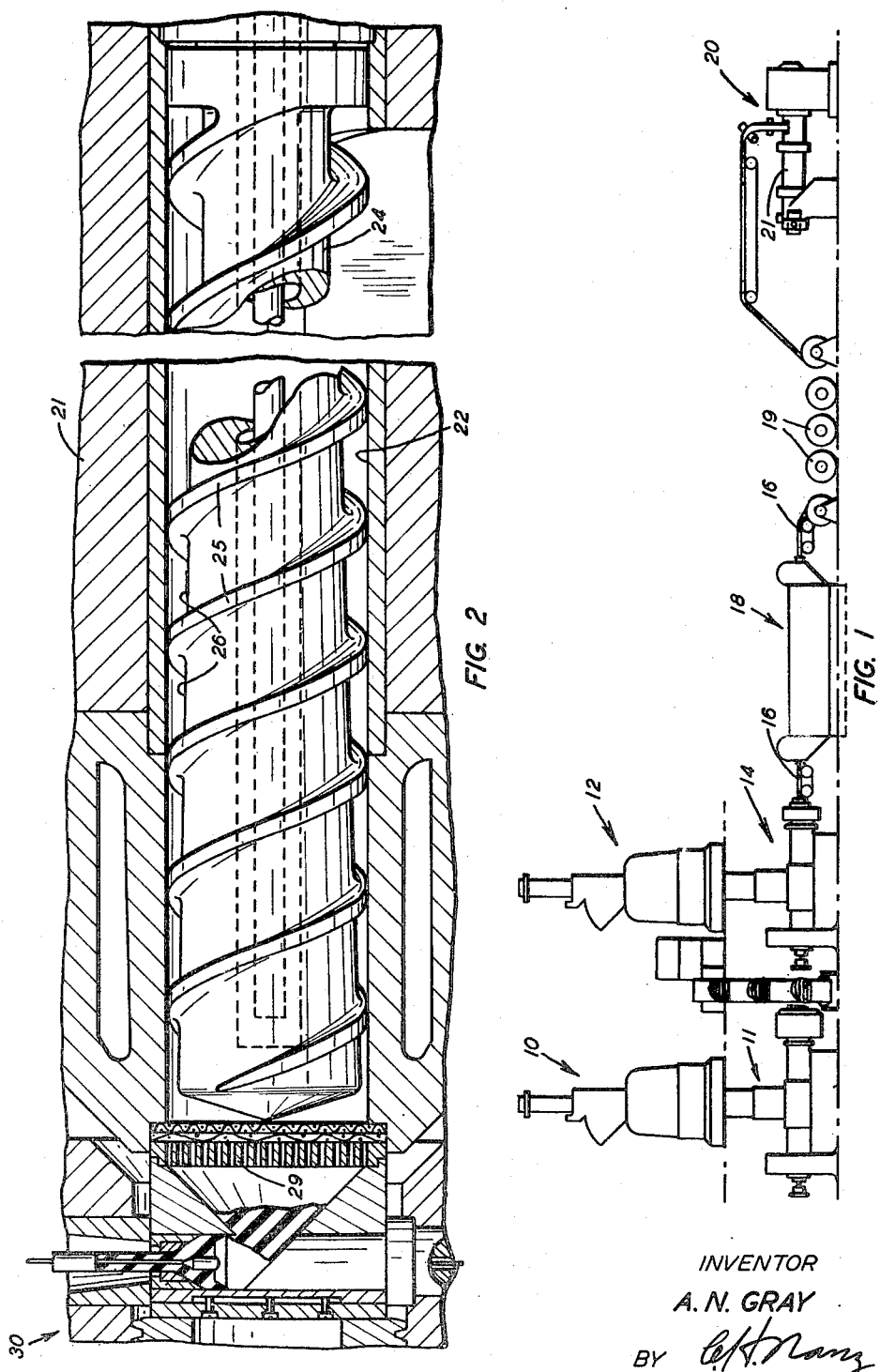
INVENTOR
A. N. GRAY
BY
ATTORNEY Patented Nov. 6, 1951

2,573,707

UNITED STATES PATENT OFFICE 2,573,707

METHODS OF PROCESSING SULFUR-VULCANIZABLE ELASTOMER COMPOUNDS

Alvin N. Gray, Edgewood, Md., assignor to Western Electric Company, Incorporated, New York, N. Y., a corporation of New York Application May 13, 1949, Serial No. 92,993

12 Claims. (Cl. 18—59)

This invention relates to methods of processing sulphur-vulcanizable elastomer compounds, and more particularly to methods of preparing, extruding and curing sulphur-vulcanizable elastomer compounds to form articles.

In the past, in the manufacture of covered conductors and covers composed of sulphur-vulcanizable elastomer compounds, the ingredients of the compounds except for the vulcanizing agents or the accelerators were mixed together and worked in a Banbury mixer, or the like. Subsequent to the mixing and working, the resulting partial compounds were cooled, and, shortly before the extrusion of the compounds, any needed accelerators or vulcanizing agents were added to the compounds, usually on an open mill. The compounds then were conveyed to extruders, were introduced while hot into the extruders, and were extruded over the conductors.

This mixing of the accelerators or vulcanizing agents into the compounds also worked the compounds and heated them to temperatures at which they could be extruded satisfactorily in any desired form, including coverings around conductors, by conventional continuous extrusion apparatus. After the compounds were extruded over the conductors, the resulting coverings were subjected to heat and pressure to cure them. However, unless the hot compounds were extruded shortly after the vulcanizing agents or the accelerators were mixed therewith, the compounds would harden prior to the extrusion thereof. That is, they would set prior to the introduction thereof into extruders, or would set in the extruders prior to the formation of coverings therefrom.

With the above-described methods it is difficult and somewhat uneconomical, because of labor required in handling and scheduling the compound, to keep a supply of the compounds flowing to the extruders which is adequate to keep the extruders operating continuously and without the formation of scrap from preextrusion setting. Also, the temperature and condition of the compound varied at the different times that various parts of each batch, or different batches, were introduced into the extruder. Consequently, size control of the extruded products was very difficult.

In order to break down the elastomer component of vulcanizable elastomer compounds sufficiently to form high quality extruded products, it is necessary, prior to introducing such compounds into the extruders, to work the compound at least a plurality of times starting from a cold state. Each compound has to be worked and mixed starting with cold materials (i. e. materials at room temperatures), the compound cooled to around room temperature so that it was susceptible to break-down, and then reworked to achieve the necessary plasticizing to place the compound in an extrudable condition before introducing it into an extruder for extruding thereof into finished-article form. Such operations require much handling equipment, working and mixing equipment, and time.

An object of this invention is to provide new and improved methods of processing sulphur-vulcanizable elastomer compounds.

Another object of the invention is to provide new and improved methods of preparing, extruding and curing sulphur-vulcanizable elastomer compounds to form articles.

A further object of the invention is to provide new and improved methods of completely mixing together all ingredients of sulphur-vulcanizable elastomer compounds prior to extruding such compounds, while eliminating premature curing of the compounds and with minimum preextrusion handling of the compounds.

A method illustrating certain features of the invention may include working fillers of a vulcanizable elastomer compound also including a sulphur-vulcanizable elastomer constituent, a curing agent and other ingredients into an elastomer constituent of the compound to partially break down the elastomer constituent and to mix the fillers therein, straining the resulting mix, mixing other ingredients of the compound into the mix thereby obtaining further partial breakdown of the compound, introducing and working a curing agent into the compound starting near the end of the last-mentioned mixing step, and cooling the compound sufficiently to arrest vulcanization thereof.

A complete understanding of the invention may be obtained from the following detailed description of methods forming specific embodiments thereof, when read in conjunction with the appended drawings, in which:

Fig. 1 is a schematic elevation of an apparatus for practicing a method forming one embodiment of the invention, and Fig. 2 is an enlarged, horizontal section of a portion of the apparatus shown in Fig. 1.

Referring now in detail to the drawings, there is shown in Fig. 1 an apparatus for processing a highly accelerated, vulcanizable compound which may include as its essential vulcanizable constituent, a sulphur-vulcanizable, rubbery elastomer. The elastomer may be a diolefine polymer, for example, natural rubber, a synthetic, vulcanizable, rubber-like material, such as Buna S (a copolymer of butadiene and styrene), Buna N (a copolymer of butadiene and acrylonitrile), or butyl rubber (a copolymer of isobutylene and isoprene), or may be an organic polysulphide material of the type sold commercially under the trade name "Thiokol."

Example 1

One typical Buna S compound that has been found satisfactory for forming insulating covers on conductors has the following composition:

| Ingredients: | Parts by weight |
|---|---|
| Buna S | 44.08 |
| Carbon black | 13.23 |
| Peptizer | 0.88 |
| Zinc oxide | 2.20 |
| Mill sulphur | 1.76 |
| Tetramethyl-thiuram-monosulphide | 0.15 |
| Aluminum hydrate | 11.02 |
| Whiting | 12.30 |
| Plasticizer, oxidation retarders, etc. | 14.38 |
| | 100.00 |

The aluminum hydrate, the whiting, the carbon black, the zinc oxide and the peptizer are introduced into a Banbury mixer 10, and are mixed thoroughly together therein for a period of around ten minutes. This mixing works the compound to effect a substantial portion of the breakdown of the Buna S elastomer necessary for high quality extrusion, and thoroughly disperses the other ingredients introduced into the Banbury mixer in the Buna S. The compound then is dropped into a strainer 11 of conventional design, which strains the compound, extrudes it in strings and cuts the strings into short lengths.

The resulting partial compound then is inserted into a second Banbury mixer 12, and the rest of the ingredients listed hereinabove, except either the sulphur or the accelerator (tetramethyl-thiuram-monosulphide), are added to the compound, and are mixed thoroughly therein. The mixer 12 is run slowly, and is cooled to keep the temperature of the compound somewhat below 250° F. The mixer 12 works the compound to partially break it down and to incorporate the ingredients, except the omitted sulphur or accelerator, therein completely. The compound is worked in the mixer 12 for about 10 minutes, and then is dropped into a strip extruder 14. Shortly (about one minute) before the compound is dropped from the Banbury mixer 12, the omitted curing agent, namely the sulphur or the accelerator, is introduced into the Banbury mixer 12, and is incorporated into the compound by thorough mixing for about one minute. The compound then is withdrawn from the mixer 12 and is introduced into a strip extruder 14. The extruder 14 forms the compound rapidly into a strip 16, which is passed immediately through a cooler 18. The strip is cooled therein to substantially room temperature (around 70° F.), at which temperature it can be kept for weeks without vulcanization.

The mixers 10 and 12 may break down the compound sufficiently for smooth, uniform, high quality extrusion into finished article-form, when the material is heated, or the mixing and working of the compound may be stopped somewhat prior to the point at which this degree of breakdown has been accomplished. The period from the introduction into the mixer 12 of the previously omitted sulphur or accelerator to the time when it is cooled to room temperature is sufficiently short, and the temperature of the compound during this period is kept sufficiently low to prevent appreciable vulcanization of the compound. The strip 16 is reeled into pads 19—19, which may be stored for a long period if necessary without vulcanization.

The strip is conveyed when needed to an extruder 20, a portion of which is disclosed and claimed in copending application Serial No. 709,498, filed November 13, 1946, by A. N. Gray for "Apparatus for Simultaneously Advancing and Plasticizing Plastic Materials," now abandoned, and copending application Serial No. 86,062, filed April 7, 1949, by A. N. Gray for "Methods of and Apparatus for Simultaneously Advancing and Plasticizing Plastic Compounds," now Patent 2,547,000. The extruder 20 includes a cooled extrusion cylinder 21 (Fig. 2) having a smooth-walled imperforate bore 22 therein and a cooled stock screw 24 having threads 25—25 and roots 26—26. The roots gradually increase in diameter from the right hand portion of the stock screw, as viewed in Fig. 2, which is the entrance portion thereof, to the left hand end, which is the delivery end thereof. The compound is introduced into the extruder 20, which works the cold compound sufficiently to achieve any breakdown necessary for smooth, uniform extrusion and to heat the compound to bring its plasticity gradually to a point sufficiently high for straining and high quality, smooth, uniform extrusion. The extruder 20 also brings the temperature of the compound gradually to an extruding temperature of about 250° F. just as the compound flows through a strainer 29 into a head 30 of the extruder, and the cooled extruder keeps the temperature of the compound below an injurious point as it is worked. This working increases the extrudability of the Buna compound so that it is formed into a smooth-surfaced covering of uniform diameter throughout its length. The covering is vulcanized immediately after it emerges from the extruder.

Example 2

A natural rubber compound that may be processed by the method described hereinabove has the following formula:

| Ingredients: | Parts by weight |
|---|---|
| Crude rubber | 27.00 |
| Whiting | 33.75 |
| Zinc oxide | 1.35 |
| Peptizer | 0.15 |
| Lithopone | 33.74 |
| Mill sulphur | 1.00 |
| Tetramethyl-thiuram-disulphide | 0.96 |
| Plasticizers, oxidation retarders, etc. | 2.05 |
| | 100.00 |

The rubber, zinc oxide, whiting, and peptizer for the rubber are mixed together in the Banbury mixer 10, and are worked therein for about ten minutes. The compound then is dropped to the strainer 11, is strained, and is extruded and cut into strings of short length. The partial compound is introduced into the Banbury mixer 12, and is worked therein for a period of about ten minutes. All the ingredients which have not been mixed with the rubber, except either the sulphur or the accelerator (tetramethyl-thiuram-disulphide), are introduced into the mixer 12 at the start of this mixing period and are mixed therewith. The mixer 12 is run at a slow speed, and the temperature of the compound is kept somewhat below 250° F. Shortly (about one minute) before the end of this period, the omitted sulphur or accelerator is introduced into the mixer 12, and is mixed into the compound to complete it. The temperature of the compound in the mixer 12 is kept below that at which appreciable vulcanization would occur.

The compound at the end of this period is dropped immediately from the mixer 12 into the strip extruder 14. The extruder 14 forms it into a strip, and the strip is introduced immediately into the cooler 18, which cools it to room temperature at once. The mixers 10 and 12 may effect most of, but not all, the breakdown necessary for smooth, uniform extrusion, or they may effect all this breakdown, depending on the length of operation thereof.

The cold compound then may be stored awaiting extrusion, and is introduced cold into the extruder 20, which works the compound to the extent necessary to achieve the remainder of the breakdown, if the mixers were not run sufficiently long to completely break down the compound. The extruder also heats the compound to make it extrudable and strainable, and forces it through a die, which forms it to a covering over a filamentary conductor, after which the covering is vulcanized immediately. While in the extruder 20, the compound is kept at a temperature below 250° F. to prevent vulcanization.

In the above-described methods, all the ingredients of the compounds requiring appreciable straining are introduced into the mixer 10, and the resulting partial compounds do not have curing agents therein as they are strained by means of the strainer 11. Consequently, the heating of these partial compounds caused by the straining operation does not cure the compounds at all. Thus, the compounds are in a substantially strained condition when the curing agents are mixed therein, and are not subjected to the high temperatures inherent in straining while in a highly accelerated condition. While the compounds are in a highly accelerated condition as they are strained in the extruder 20, this straining occurs immediately prior to the formation of the compounds into finished products so that the high temperatures do not cause premature vulcanization thereof. Since the major portion of the foreign particles strained from the compounds are removed by the strainer 11, the extuder 20 may be operated continuously for long operating runs without clogging the strainer 29. The compounds are in substantially completely strained condition when brought to storage condition, even though the compounds are in completely formulated, highly accelerated condition when they arrive at storage. Hence, there is no need to place the compounds in a mill to incorporate the curing agents therein, as has been necessary in the past.

The above-described methods of processing sulphur-vulcanizable elastomer compounds avoid milling operations completely, which operations were necessary heretofore to introduce curing agents into the compounds very shortly before extrusion in order to prevent prevulcanization or presetting of the compound. By cooling the compound immediately after the second of the vulcanizing agent and the accelerator is introduced therein, the compound may be stored at room temperature for weeks if necessary without appreciable setting thereof. Furthermore, since the compounds are always at the same temperature when they are introduced into the extruder, products of unvarying diameter are produced for a given speed of the extruder.

A high degee of flexibility of operation is provided with the above-described methods even though the compounds are highly accelerated. That is, the compounds need not be made up immediately before their extrusion, and a supply of the accelerated compounds may be maintained for introduction into the extruders, so that the operation of the extruders need not be slowed or stopped for lack of compound. Furthermore, the compound may be formed continuously even though surpluses are built up. Thus, these pre-extrusion processing operations are much more efficient than those employed in the past.

In the methods described hereinabove there is no problem of keeping the temperatures of the compounds sufficiently high for smooth, uniform extrusion before introduction of the compounds into the extruders. Also the compounds may be delivered to the extruders without precautions to prevent cooling thereof, which precautions have been necessary in the methods formerly used. Since the compounds are introduced into the extruders at substantially the same temperature (room temperature), uniformity of the extrusion operation can be maintained without varying the extrusion conditions. This is a decided contrast to known methods, in which hot compounds are brought to extruders, wherein it is impossible, without great efforts, to keep the temperatures of the various parts of one batch and the various batches uniform.

In the use of the term "sulphur-vulcanizable," or any form of this term, throughout this application, it is meant curable by sulphur or a sulphur-bearing compound as distinguished from being curable by agents other than sulphur. For example, a sulphur-vulcanizable elastomer compound would exclude a polymerized chloroprene compound which is curable by zinc oxide. In the use of the term "curing agent" throughout this application, it is intended to designate the vulcanizing agent, or a vulcanization accelerator, or both. Obviously, vulcanizing agents and vulcanization accelerator other than those exemplified hereinabove can be used successfully with the above-described methods.

In the use of the term "highly accelerated" with reference to materials, compounds or the like, it is intended to designate compounds which will substantially cure within about 30 seconds when in a generally annular form 0.050 inch in wall thickness, and when subjected exteriorly to steam under a pressure of about 250 pounds per square inch or to conditions equivalent thereto.

The above-described methods are workable with compounds which are not highly accelerated, as well as with compounds which are highly accelerated, as are the compounds described hereinabove. However, the greatest value of these methods resides in the processing of highly accelerated compounds.

What is claimed is:

1. The method of processing highly accelerated, sulphur-vulcanizable elastomer compounds including a sulphur-vulcanizable elastomer, a peptizer, a filler, softeners and a curing agent, which comprises mixing together the elastomer, the peptizer and the filler of such a compound, straining the mixture, mixing the softeners into said mixture, mixing the omitted curing agent into the compound, maintaining the compound at a temperature less than that at which appreciable vulcanization occurs during the mixing of the curing agent therein, and then immediately cooling the compound sufficiently to arrest vulcanization thereof.

2. The method of insulating a conductor with a sulphur-vulcanizable elastomer compound including a sulphur-vulcanizable elastomer, filler material, a peptizer, softeners and a curing agent, which comprises introducing the filler material, the peptizer and the elastomer constituent of such a compound into a mixer, mixing and working the materials in the mixer sufficiently to thoroughly disperse the filler material and the peptizer in the elastomer material, straining the resulting mixture, introducing the resulting mixture into a mixer, introducing the softeners of the compound into the mixer, thoroughly mixing the softeners into the mixture for a predetermined period of time, introducing the curing agent into the mixer just before the end of said mixing period, keeping the compound below the temperature at which appreciable vulcanization occurs during the mixing of the curing agent therein, withdrawing the compound from the mixer, immediately cooling the compound sufficiently to arrest vulcanization thereof, introducing the compound into an extruder in its cooled condition, simultaneously working the compound in the extruder sufficiently to materially increase its extrudability and extruding the compound into a covering on a conductive core, and vulcanizing the covering.

3. The method of processing sulphur-vulcanizable elastomer compounds which include a sulphur-vulcanizable elastomer, filler material, a peptizer, softeners, and a pair of complementary curing agents, which comprises mixing together the filler material, the peptizer and the elastomer of such a compound in a mixing cycle, straining the resulting mixture, mixing together the strained mixture and the softeners and only one of the curing agents, mixing the omitted curing agent into the compound near the end of the last-mentioned mixing operation, cooling the compound during the mixing of the last-mentioned curing agent therein sufficiently to prevent appreciable vulcanization thereof, then cooling the compound sufficiently to arrest vulcanization thereof, inserting the cooled compound into an extruder, and continuously working the compound in the extruder to increase the extrudability thereof and simultaneously extruding the compound in finished-article form.

4. The method of processing sulphur-vulcanizable elastomer compounds including a sulphur-vulcanizable elastomer, a peptizer, filler material, softeners and a curing agent, which comprises mixing together the filler material, the peptizer and the elastomer of such a compound to thoroughly disperse the filler material and peptizer in the elastomer, straining the resulting mixture, working the softeners into the resulting mixture, cooling the compound as the softeners are worked into said mixture to keep the temperature of the mixture below 250° F., incorporating the curing agent into the mixture while the mixture is below said temperature, immediately thereafter cooling the compound to room temperature to arrest vulcanization thereof, and subsequently simultaneously working the cooled compound and extruding the compound.

5. The method of processing a sulphur-vulcanizable elastomer compound including a sulphur-vulcanizable elastomer, filler material, a peptizer, softeners and a curing agent, which comprises mixing together the filler material, the peptizer and the vulcanizable elastomer of such a compound to thoroughly disperse the filler material and the peptizer in the vulcanizable elastomer, straining the resulting mixture, working the softeners into the resulting mixture, cooling the compound as the softeners are worked into said mixture to keep the temperature of the mixture below 250° F., incorporating the curing agent into the mixture as the softeners are worked into the mixture, and cooling the resulting compound immediately after the curing agent has been incorporated into the mixture sufficiently to arrest vulcanization thereof.

6. The method of processing sulphur-vulcanizable compounds containing a sulphur-vulcanizable elastomer, a peptizer, fillers, softeners and a curing agent, which comprises working the fillers and the peptizer of such a compound into the elastomer to partially break down the elastomer and to mix the fillers and peptizer therein, straining the resulting mix, mixing the softeners of the compound into the mix thereby obtaining further partial breakdown of the elastomer, introducing the curing agent into the compound and working the curing agent into the compound starting near the end of the last-mentioned mixing step, cooling the compound sufficiently to arrest vulcanization thereof, and simultaneously working the cooled compound to break down the elastomer still further and extruding the compound.

7. The method of processing a highly accelerated, sulphur-vulcanizable compound including mineral fillers, a peptizer, softeners, a curing agent and a sulphur-vulcanizable, rubbery elastomer of the group consisting of natural rubber, copolymers of butadiene and styrene, copolymers of butadiene and acrylonitrile, copolymers of isobutylene and isoprene, and organic polysulphides, which comprises mixing the elastomer, the peptizer and the mineral fillers of such a compound together, straining the resulting mixture, mixing the softeners of such a compound into said mixture, mixing the curing agent into the resulting mixture to complete the compound, and immediately cooling the compound sufficiently to arrest vulcanization thereof.

8. The method of processing a highly accelerated, sulphur-vulcanizable compound including a copolymer of butadiene and styrene, filler material, a peptizer, softeners and a curing agent, which comprises mixing together the copolymer, the peptizer and the filler material of such a compound, straining the resulting mixture, mixing the softeners of such a compound into said mixture, mixing the curing agent into the resulting mixture to complete the compound, and cooling the compound sufficiently to arrest vulcanization thereof.

9. The method of processing a highly accelerated, sulphur-vulcanizable compound including a copolymer of butadiene and styrene, mineral fillers, a peptizer, softeners and a curing agent, which comprises mixing together the copolymer, the mineral fillers and the peptizer of such a compound to sufficiently disperse the fillers and the peptizer into the compound and to partially break down the copolymer, straining the resulting mixture, mixing the softeners into the strained mixture sufficiently to disperse the softeners thoroughly therein and to obtain a substantial portion of the remainder of the breakdown of the copolymer necessary for smooth, uniform extrusion of the compound, mixing the curing agent into the resulting mixture after the major portion of said last-mentioned mixing step has occurred to complete the compound, promptly cooling the compound sufficiently to arrest vulcanization thereof, and simultaneously working the cooled compound and extruding it into article form.

10. The method of processing a highly accelerated, sulphur-vulcanizable compound including rubber, mineral fillers, a peptizer, softeners and a curing agent, which comprises mixing the rubber, the peptizer and the mineral fillers together, straining the resulting mixture, mixing the softeners into said mixture, mixing the curing agent into the resulting mixture to complete the compound, and promptly cooling the compound sufficiently to arrest vulcanization thereof.

11. The method of processing a compound including a sulphur-vulcanizable, diolefine polymer, filler material, a peptizer, softeners and a curing agent, which comprises mixing together the filler material, the peptizer and the polymer and simutaneously working the mixture sufficiently to partially break down the polymer, straining the resulting mixture, introducing the softeners into the mixture and working the mixture sufficiently to further break down the polymer, introducing the curing agent into the mixture just before the end of the last-mentioned working period, and then immediately cooling the compound sufficiently to arrest vulcanization thereof.

12. The process of insulating a conductive core with a compound including a sulphur-vulcanizable, diolefine polymer, filler material, a peptizer, softeners and a curing agent, which comprises mixing together the filler material, the peptizer and the polymer and simultaneously working the mixture sufficiently to partially break down the polymer, straining the resulting mixture, introducing the softeners into the mixture and working the mixture sufficiently to further break down the polymer, introducing the curing agent into the mixture just before the end of the last-mentioned working period, immediately cooling the compound sufficiently to arrest vulcanization thereof, storing the cooled compound at room temperature, introducing the compound at room temperature into an extruder, passing a conductive core through the extruder, simultaneously working the compound in the extruder sufficiently to cause the compound to be readily extrudable and extruding the compound into a covering on the core, and vulcanizing the resulting covering on the core.

ALVIN N. GRAY.

REFERENCES CITED

The following references are of record in the file of this patent:

UNITED STATES PATENTS

| Number | Name | Date |
| --- | --- | --- |
| 2,426,165 | Bulifant | Aug. 26, 1947 |
| 2,459,745 | Waters | Jan. 18, 1949 |
| 2,484,705 | Gray | Oct. 11, 1949 |